US012634872B2

(12) United States Patent
Fouad et al.

(10) Patent No.: US 12,634,872 B2
(45) Date of Patent: May 19, 2026

(54) METHOD AND DEVICE FOR RESOURCE SELECTION ASSISTANCE FOR SIDELINK POSITIONING

(71) Applicant: Samsung Electronics Co., Ltd., Gyeonggi-do (KR)

(72) Inventors: Yaser Mohamed Mostafa Kamal Fouad, San Diego, CA (US); Yuhan Zhou, San Diego, CA (US); Philippe Jean Marc Michel Sartori, Naperville, IL (US)

(73) Assignee: Samsung Electronics Co., Ltd (KR)

( * ) Notice: Subject to any disclaimer, the term of this patent is extended or adjusted under 35 U.S.C. 154(b) by 328 days.

(21) Appl. No.: 18/390,225

(22) Filed: Dec. 20, 2023

(65) Prior Publication Data

US 2024/0267874 A1    Aug. 8, 2024

Related U.S. Application Data

(60) Provisional application No. 63/443,839, filed on Feb. 7, 2023.

(51) Int. Cl.
| | |
|---|---|
| *H04W 64/00* | (2009.01) |
| *H04L 5/00* | (2006.01) |
| *H04W 72/25* | (2023.01) |
| *H04W 92/18* | (2009.01) |

(52) U.S. Cl.
CPC ........... *H04W 64/00* (2013.01); *H04L 5/0051* (2013.01); *H04W 72/25* (2023.01); *H04W 92/18* (2013.01)

(58) Field of Classification Search
CPC ..... H04W 64/00; H04W 72/25; H04W 92/18; H04W 76/14; H04W 72/02; H04L 5/0051; H04L 5/00; H04L 5/0048; H04L 5/0053; H04L 5/0094
See application file for complete search history.

(56) References Cited

U.S. PATENT DOCUMENTS

| | | | | |
|---|---|---|---|---|
| 2021/0297206 | A1* | 9/2021 | Manolakos | ....... H04W 72/0446 |
| 2021/0337519 | A1* | 10/2021 | Farag | .................... H04L 5/0078 |
| 2022/0030575 | A1* | 1/2022 | Farag | .................... H04W 72/02 |
| 2022/0078758 | A1* | 3/2022 | Lee | ........................ H04L 5/0053 |

(Continued)

FOREIGN PATENT DOCUMENTS

| | | |
|---|---|---|
| WO | WO 2021/188220 | 9/2021 |
| WO | WO 2022/238314 | 11/2022 |

OTHER PUBLICATIONS

European Search Report dated Jul. 2, 2024 issued in counterpart application No. 24155451.8-1206, 12 pages.

(Continued)

*Primary Examiner* — Ankur Jain
(74) *Attorney, Agent, or Firm* — The Farrell Law Firm, P.C.

(57) ABSTRACT

A method and a device are provided in which a request for positioning assistance is received from a UE in a dedicated field of sidelink (SL) control information (SCI). A request for assistance in selecting resources for SL-positioning reference signal (PRS) transmission is transmitted to the UE. A set of one or more preferred or non-preferred resources for SL-PRS transmission is received from the UE. Resources for the SL-PRS transmission are selected based on at least the set of one or more preferred or non-preferred resources.

14 Claims, 9 Drawing Sheets

(56) References Cited

U.S. PATENT DOCUMENTS

2022/0256553 A1*  8/2022  Lin ..................... H04W 72/566
2023/0232374 A1    7/2023  Lee et al.

OTHER PUBLICATIONS

Futurewei, "Potential Solutions for Sidelink Positioning", R1-2208372, 3GPP TSG RAN WG1 #110bis-e, Oct. 10-19, 2022, 7 pages.
European Search Report dated Nov. 18, 2024 Issued in counterpart application No. 24155451.8-1206, 16 pages.
5GAA input to 3GPP Rel. 18 Workshop, 2021, pp. 12.
Intel Corporation, CATT, Ericsson, "New WID on Expanded and Improved NR Positioning", 3GPP TSG RAN Meeting #98-e RP-223549 Electronic Meeting, Dec. 12-16, 2022, pp. 7.
3GPP TS 38.213 V17.4.0 (Dec. 2022), pp. 258.
3GPP TR 37.985 V17.1.1 (Mar. 2022), pp. 38.
3GPP TS 38.214 V17.4.0 (Dec. 2022), pp. 230.
3GPP TS 38.215 V17.2.0 (Sep. 2022), pp. 26.

* cited by examiner

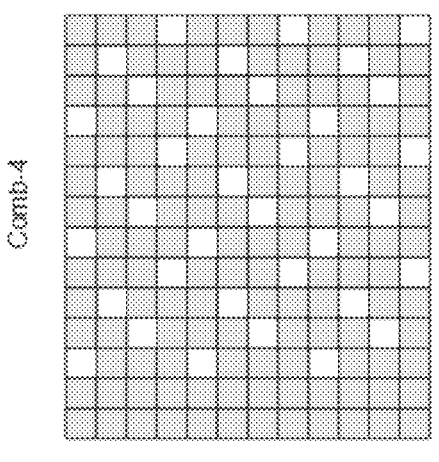
Comb-4
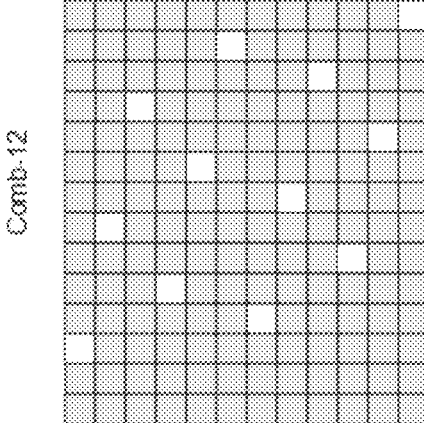
Comb-12
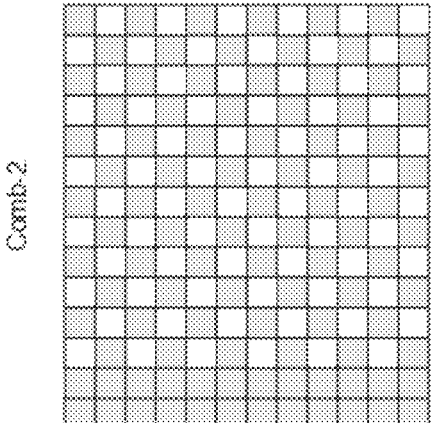
Comb-2
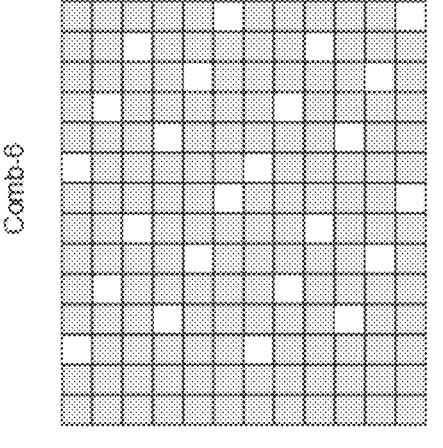
Comb-6
PRS Resource 202
□
FIG. 2

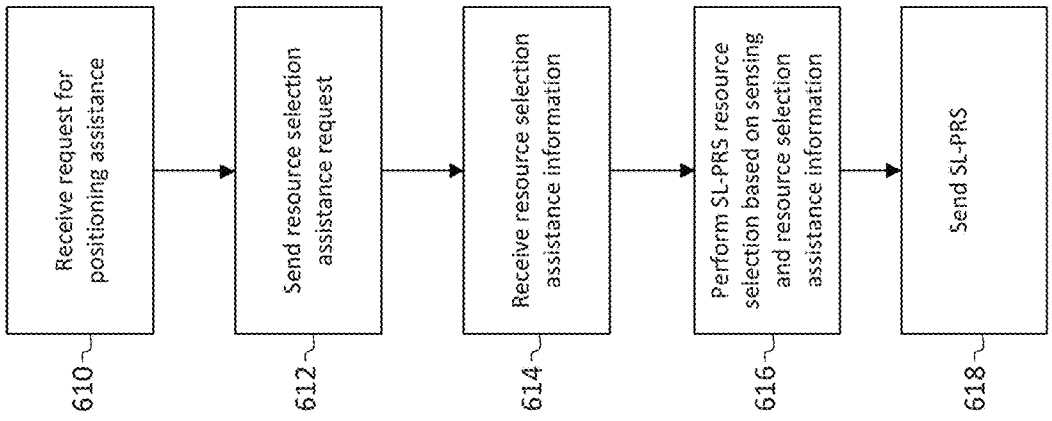

610    Receive request for positioning assistance

612    Send resource selection assistance request

614    Receive resource selection assistance information

616    Perform SL-PRS resource selection based on sensing and resource selection assistance information 618    Send SL-PRS

FIG. 6B

602    Send request for positioning assistance

604    Receive request for SL-PRS resource selection assistance

606    Perform sensing and provide set of preferred or non-preferred resources for SL-PRS transmission 608    Receive SL-PRS

FIG. 6A

METHOD AND DEVICE FOR RESOURCE SELECTION ASSISTANCE FOR SIDELINK POSITIONING

CROSS-REFERENCE TO RELATED APPLICATION

This application claims the priority benefit under 35 U.S.C. § 119(c) of U.S. Provisional Application No. 63/443,839, filed on Feb. 7, 2023, the disclosure of which is incorporated by reference in its entirety as if fully set forth herein.

TECHNICAL FIELD

The disclosure generally relates to sidelink (SL) communication. More particularly, the subject matter disclosed herein relates to improvements to resource selection assistance for SL positioning.

SUMMARY

In 3$^{rd}$ Generation Partnership Project (3GPP) release (Rel)-16/17, both positioning and SL communication were standardized. However, SL positioning was not considered. The scope of 3GPP Rel-18 has been defined to include standardization of SL positioning.

To effectively perform SL positioning, new radio (NR) user equipments (UEs) must transmit their SL-positioning reference signal (SL-PRS) efficiently and in a timely manner. When transmitting these reference signals (RSs) in a shared spectrum, the signals may collide with SL-PRS transmissions of other UEs as well as data transmissions of neighboring UEs, thereby deteriorating the quality of the SL-PRS and the accuracy of the location estimate.

To overcome these issues, systems and methods are described herein to enable NR UEs to efficiently select resources for transmitting their SL-PRSs, while minimizing the number of potential collisions between selected resources. In particular, techniques are provided that enable inter-UE coordination (i.e., resource selection assistance) to help resolve collisions due to a hidden node, as well as consistent collisions with neighboring UE transmissions.

In an embodiment, a method is provided in which a request for positioning assistance is transmitted from a first UE, to a second UE, in a dedicated field of SL control information (SCI), and an SL-PRS is received at the first UE on selected resources from the second UE.

In an embodiment, a method is provided in which a request for assistance in selecting resources for SL-PRS transmission is transmitted from a first UE, to a second UE. A set of one or more preferred or non-preferred resources for the SL-PRS transmission is received at the first UE, from the second UE. The resources for SL-PRS transmission are selected by the first UE based on at least the set of one or more preferred or non-preferred resources.

In an embodiment, a first UE is provided including a processor and a non-transitory computer readable storage medium storing instructions. When executed, the instructions cause the processor to receive a request for positioning assistance from a second UE in a dedicated field of SCI, and transmit a request for assistance in selecting resources for SL-PRS transmission to the second UE. The instructions also cause the processor to receive a set of one or more preferred or non-preferred resources for SL-PRS transmission from the second UE, and select resources for the SL-PRS transmission based on at least the set of one or more preferred or non-preferred resources.

BRIEF DESCRIPTION OF THE DRAWING

In the following section, the aspects of the subject matter disclosed herein will be described with reference to exemplary embodiments illustrated in the figures, in which:

FIG. 2 is a diagram illustrating downlink (DL) PRS resource allocation for $$K_{comb}^{PRS} = 2, 4, 6, 12 \text{ when, } L_{PRS} = 12 \text{ and } l_{start}^{PRS} = 2;$$

FIG. 6A is a flowchart illustrating a method for SL-PRS reception at a UE, according to an embodiment;

FIG. 6B is a flowchart illustrating SL-PRS transmission from a UE, according to an embodiment;

DETAILED DESCRIPTION

Figure 1:
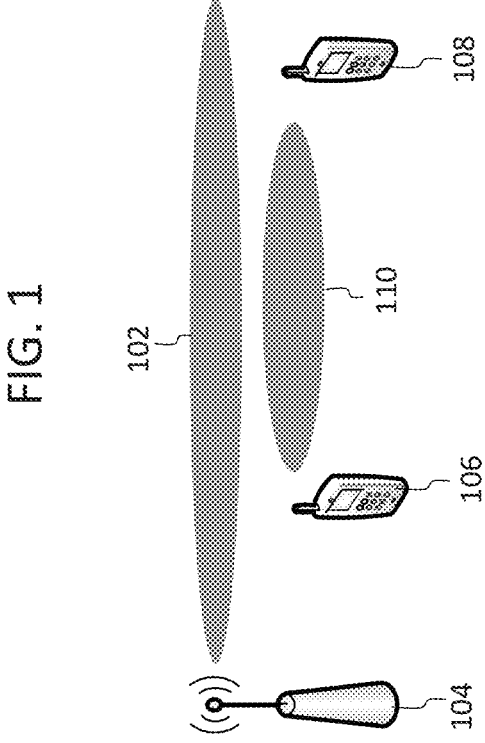
FIG. 1 is a diagram illustrating a communication system, according to an embodiment.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

FIG. 1 is a diagram illustrating a communication system, according to an embodiment. In the architecture illustrated in FIG. 1, a control path 102 may enable the transmission of control information through a network established between a base station or a gNode B (gNB) 104, a first UE 106, and a second UE 108. A data path 110 may enable the transmission of data (and some control information) on a SL between the first UE 106 and the second UE 108. The control path 102 and the data path 110 may be on the same frequency or may be on different frequencies.

The 3GPP Rel-16 design of a PRS may be reused for SL positioning. Specifically, the sequences for PRS may be generated by Gold sequences and mapped to quadrature phase shift keying (QPSK) constellation points. At least 4096 different sequence identifiers (IDs) may be supported. Furthermore, a resource element (RE) pattern of a DL PRS may follow a comb-structure with the potential for a larger number of different densities (e.g., 1, 2, 3, 4, 6, 12) per physical resource block (PRB). The bandwidth of the PRS may be configurable. A staggered RE pattern over time and frequency may be used to achieve an effective comb-1 structure at the receiver (i.e., UE).

The PRS sequence r(m) is the QPSK symbol written as Equation (1) below.

$$r(m) = \frac{1}{\sqrt{2}}(1 - 2c(2m)) + j\frac{1}{\sqrt{2}}(1 - 2c(2m + 1)) \tag{1}$$

In Equation (1), the pseudo-random sequence c(i) is a length-31 Gold sequence. The output sequence c(n) of length $M_{PN}$, where n=0, 1, . . . , $M_{PN}$-1, may be defined by Equations (2)-(4) below.

$$\begin{aligned} c(n) &= (x_1(n + N_C) + x_2(n + N_C)) \bmod 2 \\ x_1(n + 31) &= (x_1(n + 3) + x_1(n)) \bmod 2 \\ x_2(n + 31) &= (x_2(n + 3) + x_2(n + 2) + x_2(n + 1) + x_2(n)) \bmod 2 \end{aligned} \tag{2)-(4)}$$

In Equations (2)-(4), $N_C$=1600 and the first m-sequence $x_1(n)$ may be initialized with $x_1(0)$=1, $x_1(n)$=0, n=1, 2, . . . , 30. The initialization of the second m-sequence, $x_2(n)$ is denoted by $$c_{init} = \sum_{i=0}^{30} x_2(i) \cdot 2^i,$$

which may be generated by Equation (5) below.

$$c_{init} = \left( 2^{22} \left\lfloor \frac{n_{ID,seq}^{PRS}}{1024} \right\rfloor + 2^{10} \left( N_{symb}^{slot} n_{s,f}^{\mu} + l + 1 \right) \left( 2 \left( n_{ID,seq}^{PRS} \bmod 1024 \right) + 1 \right) + \right. \tag{5}$$

$$\left. n_{ID,seq}^{PRS} \bmod 1024 \right) \bmod 2^{31}$$

In Equation (5), $$n_{s,f}^{\mu}$$

is the slot number, the downlink PRS sequence ID $$n_{ID,seq}^{PRS} \in \{0, 1, \ldots, 4095\}$$

is given by the higher-layer parameter, and l is the orthogonal frequency-division multiplexing (OFDM) symbol within the slot to which the sequence is mapped.

For each downlink PRS resource configured, the UE may assume that the sequence r(m) is scaled with a factor $\beta_{PRS}$ and mapped to resources elements $(k,l)_{p,\mu}$ according to Equations (6) and (7) below.

$$k = mK_{comb}^{PRS} + \left( \left( k_{offset}^{PRS} + k' \right) \bmod K_{comb}^{PRS} \right) \tag{6}, (7)$$

$$l = l_{start}^{PRS}, l_{start}^{PRS} + 1, \ldots, l_{start}^{PRS} + L_{PRS} - 1$$

Equations (6) and (7) may be based on the following conditions. The resource element $(k,l)_{p,\mu}$ may be within the resource blocks occupied by the downlink PRS resource for which the UE is configured. The symbol l may not be used by any synchronization signal (SS)/physical broadcast channel (PBCH) block used by the serving cell for downlink PRS transmitted from the serving cell, or indicated by the higher-layer parameter for downlink PRS transmitted from a non-serving cell. DL PRS may be transmitted in some specific slots which are indicated by high-layer parameters.

Additionally, $$l_{start}^{PRS}$$

is the first symbol of the downlink PRS within a slot and may be given by the higher-layer parameter, and the size of the downlink PRS resource in the time domain $L_{PRS} \in \{2,4,6,12\}$ may be given by the higher-layer parameter. The comb size $$K_{comb}^{PRS} \in \{2, 4, 6, 12\}$$

may be given by the higher-layer parameter for a downlink PRS resource configured for real time text (RTT)-based propagation delay compensation, otherwise may be given by the higher-layer parameter such that the combination $$\{L_{PRS}, K_{comb}^{PRS}\}$$

is one of {2, 2}, {4, 2}, {6, 2}, {12, 2}, {4, 4}, {12, 4}, {6, 6}, {12, 6} and {12, 12}. The resource-element offset $$k_{offset}^{PRS} \in \{0, 1, \ldots, K_{comb}^{PRS} - 1\}$$

may be given by the higher-layer parameter, and the quantity k' may be given by Table 1 below, which shows the frequency offset k' as a function of $$l - l_{start}^{PRS}.$$

The reference point for k=0 may be the location of point A of the positioning frequency layer, in which the downlink PRS resource is configured, where point A may be given by the higher-layer parameter.

TABLE 1

| Symbol number within the downlink PRS resource $l - l_{start}^{PRS}$ | | | | | | | | | | | |
| --- | --- | --- | --- | --- | --- | --- | --- | --- | --- | --- | --- |
| $K_{comb}^{PRS}$ | 0 | 1 | 2 | 3 | 4 | 5 | 6 | 7 | 8 | 9 | 10 | 11 |
| 2 | 0 | 1 | 0 | 1 | 0 | 1 | 0 | 1 | 0 | 1 | 0 | 1 |
| 4 | 0 | 2 | 1 | 3 | 0 | 2 | 1 | 3 | 0 | 2 | 1 | 3 |
| 6 | 0 | 3 | 1 | 4 | 2 | 5 | 0 | 3 | 1 | 4 | 2 | 5 |
| 12 | 0 | 6 | 3 | 9 | 1 | 7 | 4 | 10 | 2 | 8 | 5 | 11 |

FIG. 2 is a diagram illustrating DL PRS resource allocation for $$K_{comb}^{PRS} = 2, 4, 6, 12$$

when, $$L_{PRS} = 12 \text{ and } l_{start}^{PRS} = 2.$$

Specifically, PRS resources 202 are shown in each of Comb-2, Comb-4, Comb-6, and Comb-12.

An SL physical channel may correspond to a set of resource elements carrying information originating from higher layers. A physical SL shared channel (PSSCH) may carry second stage SCI and an SL data payload. A physical SL broadcast channel (PSBCH) may be equivalent to PBCH in Uu link. A physical SL control channel (PSCCH) may carry first stage SCI. A physical SL feedback channel (PSFCH) may carry 1-bit hybrid automatic repeat request (HARQ)-acknowledgement (ACK) feedback.

An SL physical signal may correspond to a set of resource elements used by the physical layer, but does not carry information originating from higher layers. A demodulation-reference signal (DM-RS) may be for PSCCH, PSSCH and PSBCH. A channel-state information-reference signal (CSI-RS) may be for CSI measurement on an SL. A phase-tracking reference signal (PT-RS) may be for frequency range 2 (FR2) phase noise compensation. A SL primary synchronization signal (S-PSS) may be for synchronization on an SL. An SL secondary synchronization signal (S-SSS) may be for synchronization on an SL.

In NR SL, a self-contained approach may be considered, whereby each slot contains control, data, and, in some cases, feedback. A regular NR SL slot includes 14 OFDM symbols. However, the SL may also be pre-configured/configured to occupy less than 14 symbols in a slot.

SCI in NR vehicle to everything (V2X) may be transmitted in two stages. The first stage SCI (SCI format 1-A), carried on PSCCH, may include information to enable sensing operations, as well as a resource allocation field for scheduling of PSSCH and second stage SCI. The second stage SCI (SCI format 2-A or SCI format 2-B) may be transmitted in PSSCH resources and associated with the PSSCH DMRS, which includes information for decoding PSSCH.

The PSCCH and PSSCH may be multiplexed in time and frequency within the same slot. Depending on whether or not feedback is configured for a given slot, there may be different slot formats.

Figure 3:
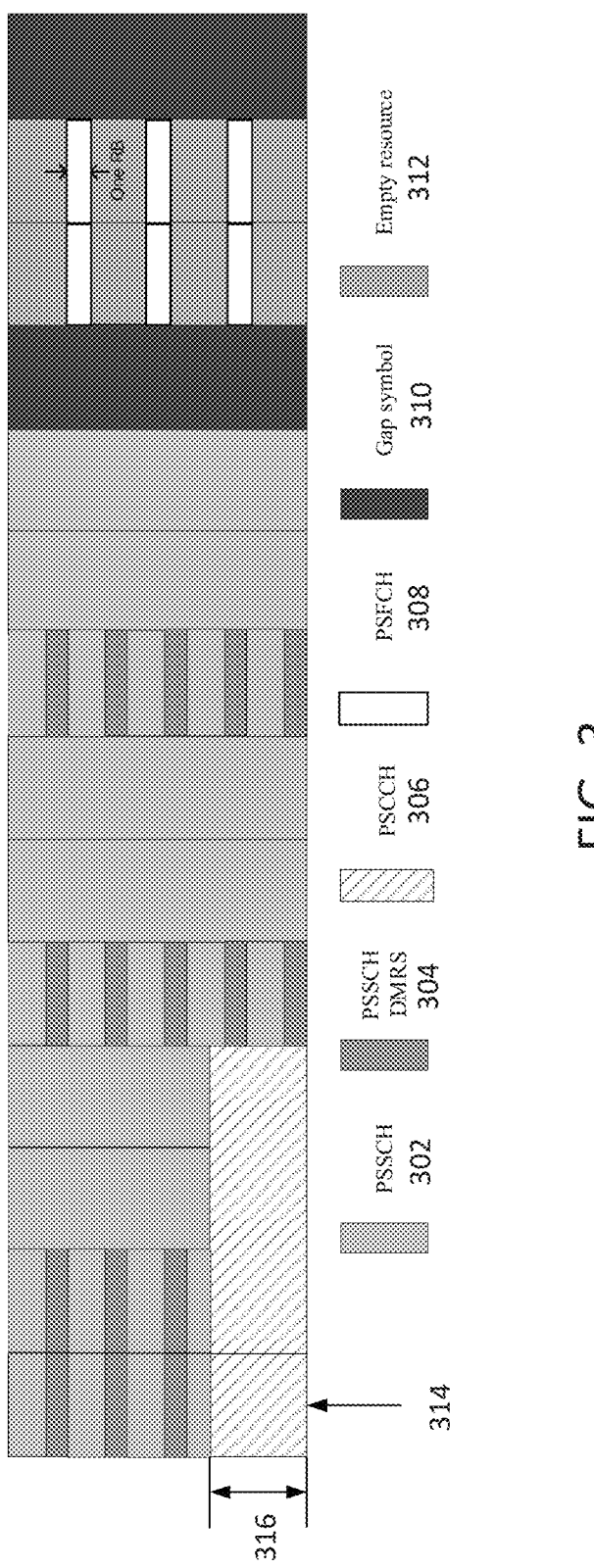
FIG. 3 is a diagram illustrating a slot format for a case with feedback resources configured.

FIG. 3 is a diagram illustrating a slot format for a case with feedback resources configured. The slot structure is shown with PSSCH 302, PSSCH DMRS 304, PSCCH 306, PSFCH 308, gap symbol 310, and empty resources 312. A first symbol 314 in a subchannel 316 may be a copy of a second symbol.

Figure 4:
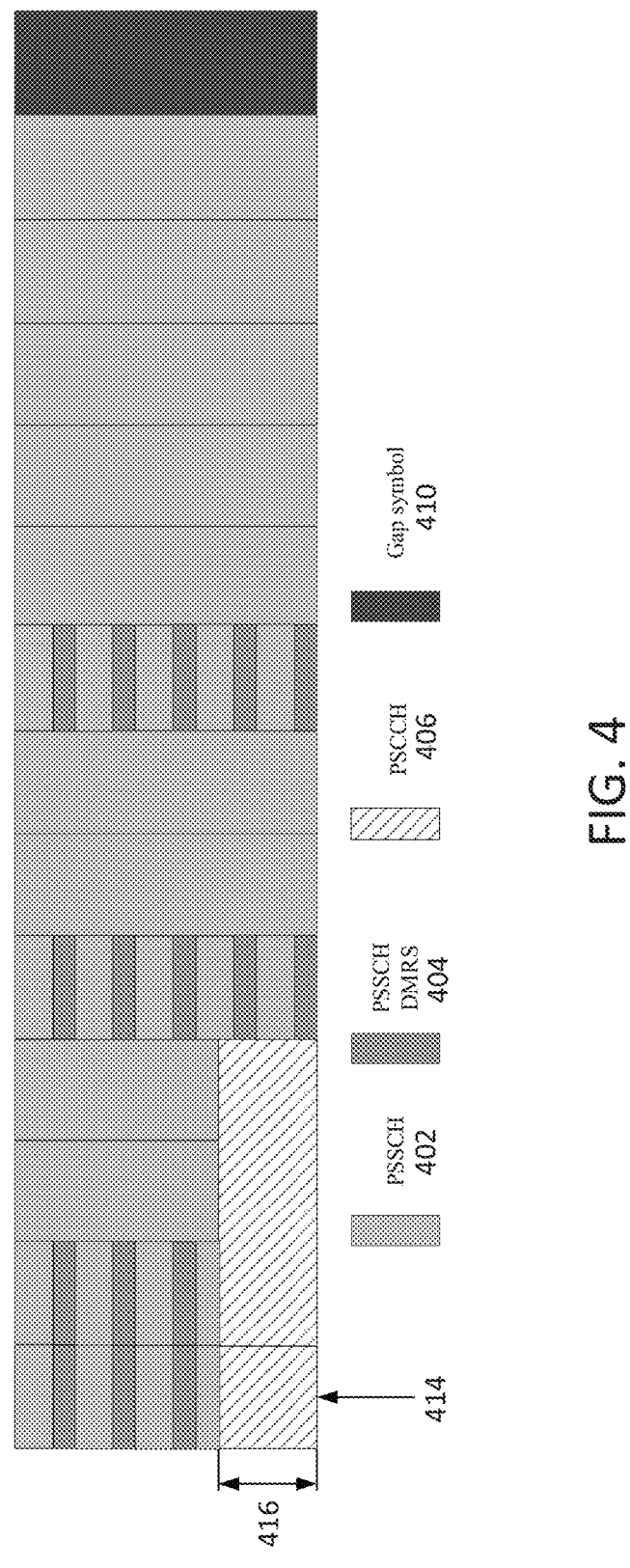
FIG. 4 is a diagram illustrating a slot format for a case without feedback resources configured.

FIG. 4 is a diagram illustrating a slot format for a case without feedback resources configured. The slot structure is shown with PSSCH 402, PSSCH DMRS 404, PSCCH 406, and gap symbol 410. A first symbol 414 in a subchannel 416 may be a copy of a second symbol.

In the two slot formats of FIGS. 3 and 4, the first symbol may be repeated for automatic gain control (AGC) settling, and the last symbol of the slot may be left as a gap to allow for transmit (Tx)/receive (Rx) switching. The first stage SCI may be carried in the PSCCH 306 or 406 with two or three symbols with a format referred to as SCI format 1-A. The number of PSCCH symbols is explicitly pre-configured/configured per Tx/Rx resource pool by a higher layer parameter sl-TimeResourcePSCCH. A lowest RB of the PSCCH 306 or 406 may be the same as a lowest RB of a corresponding PSSCH 302 or 402. In the frequency domain, the number of RBs in the PSCCH 306 or 406 may be pre-configured, which is not greater than the size of one sub-channel. In this case, if a UE is using multiple consecutive subchannels for SL transmission within a slot, the PSCCH 306 or 406 will only exist in the first subchannel.

The SL shared channel (SL-SCH), which carries transport blocks (TBs) of data for transmission over the SL, and the second stage SCI may be carried over the PSSCH 302 or 402. The resources in which the PSSCH 302 or 402 are transmitted may be scheduled or configured by a gNB (i.e., Mode 1) or determined through a sensing procedure conducted autonomously by the transmitter (i.e., Mode 2).

The feedback (if it exists as shown in FIG. 3) may be carried over the PSFCH 308. This channel is used to transmit the feedback information from the Rx to the Tx UEs. It may be used for unicast and groupcast options 2/1. In case of unicast and groupcast option 2, the PSFCH 308 may be used to transmit ACK/negative acknowledgment (NACK), whereas for the case of groupcast option 1, the PSFCH 408 may carry only NACK. For SL feedback, a sequence-based PSFCH format (PSFCH format 0) with one symbol (not including AGC training period) may be supported. In PSFCH format 0, the ACK/NACK bit may be transmitted through two Zadoff-Chu (ZC) sequences of length 12 (same root but different cyclic shift), whereby the presence of one sequence indicates an ACK and the presence of the other sequences indicates a NACK (i.e., these sequences are used in a mutually exclusive manner).

With respect to resource selection procedures for NR UEs, Mode 1 is for resource allocation by a gNB. The use cases intended for NR V2X may generate a diverse array of periodic and aperiodic message types. Therefore, Mode 1 resource allocation provides dynamic grants of SL resources from a gNB, as well as grants of periodic SL resources configured semi-statically by radio resource control (RRC) signaling, which are referred to as SL configured grants (CGs).

A dynamic SL grant downlink control information (DCI) may provide resources for one or multiple transmissions of a transport block, in order to control reliability. The transmission(s) may be subject to SL HARQ procedure, if that operation is enabled.

An SL CG may be configured once and may be immediately used by the UE, until it is released by RRC signaling (e.g., Type 1 CG). A UE may be allowed to continue using this type of SL CG when beam failure or physical layer problems occur in NR Uu until a radio link failure (RLF) detection timer expires, before falling back to an exception resource pool. The other type of SL CG, known as Type 2, may be configured once but cannot be used until the gNB sends the UE DCI indicating that it is active, and only until another DCI indicates de-activation. The resources in both types of SL CG are a set of SL resources recurring with a periodicity that a gNB will desire to match to the characteristics of the V2X traffic. Multiple CGs may be configured, to provide different services, traffic types, etc.

Modulation and coding scheme (MCS) information for dynamic and configured grants may be provided or constrained by RRC signaling instead of traditional DCI. RRC may configure the exact MCS the Tx UE uses, or a range of MCSs. The MCS may also be left as not configured. For cases in which RRC does not provide an exact MCS, the transmitting UE may select an appropriate MCS based on knowledge it has of the TB to be transmitted and, potentially, SL radio conditions.

The gNB scheduling activity may be driven by the UE reporting its SL traffic characteristics to the gNB, or by performing an SL buffer status report (BSR) procedure similar to that on Uu to request an SL resource allocation from the gNB.

Additionally, with respect to resource selection procedures for NR UEs, Mode 2 is for UE-autonomous resource selection. A UE may sense, within a pre-configured/configured resource pool, which resources are not in use by other UEs with higher-priority traffic, and may choose an appropriate amount of such resources for its own transmissions. Having selected such resources, the UE may transmit and re-transmit in the chosen resources a certain number of times, or until a cause for resource reselection is triggered.

The Mode 2 sensing procedure may select and then reserve resources for a variety of purposes, reflecting that NR V2X introduces SL HARQ in support of unicast and groupcast in the physical layer. The UE may reserve resources to be used for a number of blind transmissions/re-transmissions or HARQ-feedback-based transmissions/re-transmissions of a transport block, in which case the resources may be indicated in SCI(s) scheduling the transport block. Alternatively, the UE may select resources to be used for an initial transmission of a later transport block, in which case the resources may be indicated in an SCI scheduling of a current transport block, in a manner similar to the LTE-V2X scheme. Finally, an initial transmission of a transport block may be performed after sensing and resource selection, but without a reservation.

First-stage SCIs transmitted by UEs on a PSCCH indicate time-frequency resources in which the UE will transmit a PSSCH. These SCI transmissions may be used by sensing UEs to maintain a record of which resources have recently been reserved by other UEs. When resource selection is triggered (e.g., by traffic arrival or a re-selection trigger), the UE may consider a sensing window that starts at a pre-configured/configured time in the past, and finishes shortly before the trigger time. The window may be either 1100 ms or 100 ms wide, with the 100 ms option being useful for aperiodic traffic, and 1100 ms option being useful for periodic traffic. A sensing UE may also measure the SL-reference signal received power (RSRP) in the slots of the sensing window, which implies the level of interference that may be caused and experienced if the sensing UE were to transmit in those slots. In NR-V2X, SL-RSRP is a pre-configurable/configurable measurement of either PSSCH-RSRP or PSCCH-RSRP.

The sensing UE may then select resources for its transmission(s)/re-transmission(s) from within a resource selection window. The window may begin shortly after the trigger for selection/re-selection of resources, and cannot be longer than the remaining latency budget of the packet due to be transmitted. Reserved resources in the selection window with SL-RSRP above a threshold may be excluded from being candidates by the sensing UE, with the threshold set according to priorities of the traffic of the sensing and transmitting UEs. Thus, a higher priority transmission from a sensing UE may occupy resources that are reserved by a transmitting UE with sufficiently low SL-RSRP and sufficiently lower-priority traffic.

If a number of resources in the set of resources in the selection window that have not been excluded is less than a certain proportion of available resources within the window, the SL-RSRP exclusion threshold may be relaxed in 3 dB steps. The proportion may be set by pre-configuration/configuration to 20%, 35%, or 50% for each traffic priority. The UE may randomly select an appropriate amount of resources from this non-excluded set. The resources selected are not in general periodic. Up to three resources may be indicated in each SCI transmission, and each may be independently located in time and frequency. When the indicated resources are for semi-persistent transmission of another transport block, the range of supported periodicities may be expanded compared to LTE-V2X, in order to cover the broader set of envisioned use cases in NR-V2X.

Shortly before transmitting in a reserved resource, a sensing UE may re-evaluate the set of resources from which it can select, to check whether its intended transmission is still suitable, taking account of late-arriving SCIs that are typically due to an aperiodic higher-priority service starting to transmit after the end of the original sensing window. If the reserved resources would not be part of the set for selection at this time (T3), then new resources may be selected from the updated resource selection window. The cut-off time T3 may be long enough before transmission to allow the UE to perform the calculations relating to resource re-selection.

There are a number of triggers for resource re-selection, several of which are similar to LTE-V2X. In addition, there is the possibility to configure a resource pool with a pre-emption function designed to help accommodate aperiodic SL traffic, so that a UE reselects all the resources it has already reserved in a particular slot if another nearby UE with higher priority indicates it will transmit in any of them, implying a high-priority aperiodic traffic arrival at the other UE, and the SL-RSRP is above the exclusion threshold. The application of pre-emption may apply between all priorities of data traffic, or only when the priority of the pre-empting traffic is higher than a threshold and higher than that of the pre-empted traffic. A UE does not need to consider the possibility of pre-emption later than time T3 before the particular slot containing the reserved resources.

In Mode 2 resource allocation, the higher layer may request the UE to determine a subset of resources from which the higher layer will select resources for PSSCH/PSCCH transmission. To trigger this procedure, in slot n, the higher layer may provide parameters for this PSSCH/PSCCH transmission. The parameters may include the resource pool from which the resources are to be reported, LI priority, $prio_{TX}$, the remaining packet delay budget, the number of sub-channels to be used for the PSSCH/PSCCH transmission in a slot, $L_{subCH}$, and optionally, the resource reservation interval, $P_{rsvp\_TX}$, in units of ms.

Certain higher layer parameters may affect this procedure. An internal parameter $T_{2min}$ may be set to a corresponding value from higher layer parameter sl-SelectionWindowList for the given value of $prio_{TX}$. Parameter sl-Thres-RSRP-List may provide an RSRP threshold for each combination $(p_i,p_j)$, where $p_i$ is the value of the priority field in a received SCI format 1-A and $p_j$ is the priority of the transmission of the UE selecting resources, and where, for a given invocation of this procedure, $p_j=prio_{TX}$. Parameter sl-RS-ForSensing may be selected if the UE uses the PSSCH-RSRP or PSCCH-RSRP measurement. Parameter sl-ResourceRserve-PeriodList may also affect this procedure. Internal parameter $T_0$ may be defined as the number of slots corresponding to sl-Sensing Window msec. Internal parameter X for a given $prio_{TX}$ may be defined as sl-TxPercentageList ($prio_{TX}$) converted from percentage to ratio. If parameter sl-Preemption-Enable is provided, and if it is not equal to 'enabled', internal parameter $prio_{pre}$ may be set to the higher layer-provided parameter sl-PreemptionEnable.

The resource reservation interval, $P_{rsvp\_TX}$, if provided, may be converted from units of ms to units of logical slots, resulting in $$P'_{rsvp\_TX} \cdot (t_0^{SL}, t_1^{SL}, t_2^{SL}, ...)$$

denotes the set of slots which can belong to a sidelink resource pool.

A candidate single-slot resource for transmission $R_{x,y}$ may be defined as a set of $L_{subCH}$ contiguous sub-channels with sub-channel x+j in slot $$t_y^{SL}$$

where $j=0, ..., L_{subCH}-1$. The UE may assume that any set of $L_{subCH}$ contiguous sub-channels included in the corresponding resource pool within the time interval $[n+T_1, n+T_2]$ correspond to one candidate single-slot resource, where selection of $T_1$ is up to UE implementation under $0 \leq T_1 \leq T_{proc,1}$, where $T_{proc,1}$ is defined in slots. If $T_{2min}$ is shorter than the remaining packet delay budget (in slots) then $T_2$ may be up to UE implementation subject to $T_{2min} \leq T_2 \leq$ remaining packet budget (in slots). Otherwise, $T_2$ may be set to the remaining packet delay budget (in slots). The total number of candidate single-slot resources is denoted by $M_{total}$.

The sensing window may be defined by the range of slots $[n-T_0, n-T_{proc,0}]$, where $T_0$ is defined above and $T_{proc,0}$ is defined in slots. The UE may monitor slots which can belong to an SL resource pool within the sensing window except for those in which its own transmissions occur. The UE may perform the behavior in the following steps based on the decoded PSCCH and the measured RSRP in these slots.

The internal parameter $Th(p_i,p_j)$ may be set to the corresponding value of RSRP threshold indicated by the i-th field in sl-Thres-RSRP-List, where $i=p_i+(p_j-1)*8$.

The set $S_A$ may be initialized to the set of all the candidate single-slot resources.

The UE may exclude any candidate single-slot resource Rey from the set $S_A$ if it meets certain conditions. The conditions may include that the UE has not monitored slot $$t_m^{SL},$$

and for any periodicity value allowed by the higher layer parameter reservationPeriodAllowed and a hypothetical SCI format 0-1 received in slot $$t_m^{SL}$$

with a "Resource reservation period" field set to that periodicity value and indicating all subchannels of the resource pool in this slot, the previous condition may be met.

The UE may exclude any candidate single-slot resource Rey from the set $S_A$ if it meets certain conditions. The conditions may include that the UE receives an SCI format 0-1 in slot $$t_m^{SL},$$

and the "Resource reservation period" field, if present, and a "Priority" field in the received SCI format 0-1 indicate the values $P_{rsvp\_RX}$ and $prio_{Rx}$, respectively. The conditions may also include the RSRP measurement, performed according to received SCI format 0-1, being higher than $Th(prio_{Rx})$. Further, the conditions may include the SCI format received in slot $$t_m^{SL}$$

or the same SCI format which, if and only if the "Resource reservation period" field is present in the received SCI format 0-1, may be assumed to be received in slot(s)

$$t_{m+q\times P'_{rsvp\_RX}}^{SL}.$$

The set of resource blocks and slots may overlap with $$R_{x,y+j\times P'_{rsvp\_TX}}$$

for q=1, 2, . . . , Q and j=0, 1, . . . , $C_{resel}$−1. Here, $$P'_{rsvp\_RX}$$

is P_hd rsvp_RX converted to units of logical slots, $$Q = \left\lceil \frac{T_{scal}}{P_{rsvp\_RX}} \right\rceil$$

if $$P_{rsvp\_RX} < T_{scal} \text{ and } n' - m \le P'_{rsvp\_RX},$$

where $$t_{n'}^{SL} = n$$

if slot n belongs to the set $$(t_0^{SL}, t_1^{SL}, \ldots, t_{T_{max}}^{SL}),$$

otherwise slot $$t_{n'}^{SL}$$

may be the first slot after slot n belonging to the set $$(t_0^{SL}, t_1^{SL}, \ldots, t_{T_{max}}^{SL}).$$

Otherwise, $Q=1 \cdot T_{scal}$ may be set to selection window size $T_2$ converted to units of msec.

If the number of candidate single-slot resources remaining in the set $S_A$ is smaller than $X \cdot M_{total}$, then $Th(p_i,p_j)$ may be increased by 3 dB for each priority value $Th(p_i,p_j)$ and the procedure continues.

The UE may report the remaining of set $S_A$ to higher layers, and the higher layer may randomly select a candidate resource for transmission.

In NR Rel-17, two resource selection assistance schemes were developed to improve the reliability of SL transmissions. The objective of these schemes is to resolve the conflicts due to the half-duplex constraint, the hidden node problem, and consistent collisions.

In the first scheme (i.e., scheme 1), an assisting UE (UE-A) may provide either a set of preferred or non-preferred resources to an assisted UE (UE-B). This may be performed based on an explicit request from UE-B for resource selection assistance or based on some pre-configured triggering condition. To obtain the set of preferred or non-preferred resources, UE-A may execute the Mode 2 resource selection scheme to identify the resources reserved by its neighboring UEs. This subsequently may increase the effective sensing range of UE-B and may help to resolve the hidden node problem. In addition, UE-A may also consider the set of reserved resources for its future transmissions when performing the resource selection, thereby reducing the impact of the half-duplex constraint on the performance. Once the resource selection assistance set is acquired at UE-A, it may transmit this set to UE-B within a given time constraint. When UE-B receives the set of resources, two cases may be considered.

In a first case, when UE-B performs sensing for resource selection, it may consider both the received resource selection assistance set and its own sensing results when performing resource selection. In particular, when a non-preferred resource set is received, these resources may be excluded from the resources obtained after performing sensing and before the final selection by the MAC layer. Similarly, when a preferred resource set is received, UE-B may obtain the intersection set between the sensed resources and the received preferred resource set, and passes this intersection set to the MAC layer for resource selection.

In a second case, when UE-B does not perform sensing, it may use only the received preferred resource set and passes this set to the MAC layer for resource selection.

When sending the resource selection assistance set, UE-A must occupy at least one subchannel over one slot. In addition, it is required to perform sensing to find the resources to transmit its assistance report. When the assistance is performed based on a request from UE-B, there is also a need to reserve resources and perform a transmission that carries the resource selection assistance request. Therefore, scheme 1 may result in high latency and resource consumption, especially in cases where UE-B is transmitting a short packet with tight latency constraints.

To address this drawback, scheme 2 was developed in which UE-A uses the PSFCH resources to provide a conflict indication to UE-B. In particular, when UE-B sends SCI that includes a reservation of a future resource and UE-A detects that this resource reservation is conflicting with another reservation from a neighboring UE, then it may use the PSFCH to send a conflict indication to UE-B. Subsequently, UE-B may perform resource re-selection to obtain a non-conflicting resource for its future transmission.

In NR Rel-16/Rel-17, congestion control may be applied to reduce the chances of collisions between neighboring device transmissions when the system is highly occupied. In particular, the following two metrics are configured for SL congestion control.

A first metric is a channel busy ratio (CBR), which, for a given past duration (typically 100 ms), is the ratio between the number of subchannels with a measured received signal strength (RSSI) above a threshold and the total number of subchannels within the same duration.

A second metric is a channel occupancy ratio (CR), which, for a given past duration and a future duration, is the total number of subchannels used in the past duration and granted for the future duration to the total number of subchannels within the same duration.

When performing positioning, multiple UEs may be involved to either transmit or receive SL-PRS(s). This makes the SL-PRS resource assignment difficult in that each UE may experience different interference environments, and thus, one SL-PRS that is ideal for a first UE may not be ideal for a second UE. Additionally, SL transmissions may suffer from the hidden node problem due to the limited sensing capability of NR UEs and the distributed resource selection nature (i.e., Mode 2). Therefore, there is a need for UE coordination when allocating SL-PRS resources for SL positioning.

Figures 5A, 5B:
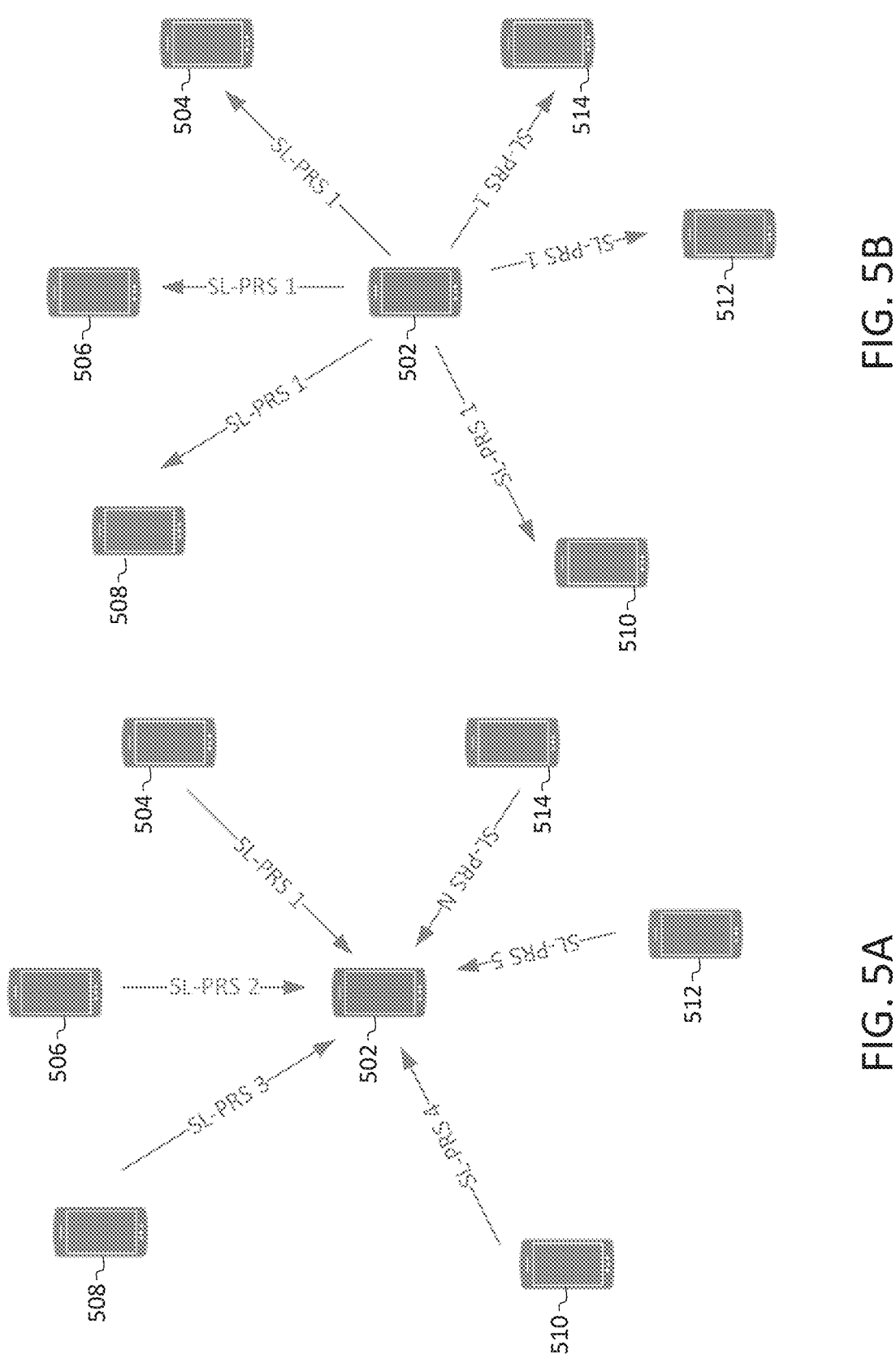
FIG. 5A is a diagram illustrating a UE receiving multiple SL-PRSs for performing positioning measurements, according to an embodiment.
FIG. 5B is a diagram illustrating a UE transmitting an SL-PRS for positioning measurements, according to an embodiment.

FIG. 5A is a diagram illustrating a UE receiving multiple SL-PRSs for performing positioning measurements, according to an embodiment. UE A 502 receives SL-PRS 1 from UE B-1 504, SL-PRS 2 from UE B-2 506, SL-PRS 3 from UE B-3 508, SL-PRS 4 from UE B-4 510, SL-PRS 5 from UE B-5 512, and SL-PRS N from UE B-N 514.

FIG. 5B is a diagram illustrating a UE transmitting an SL-PRS for positioning measurements, according to an embodiment. Multiple UEs perform measurements using the SL-PRS sent by UE A. UE A 502 may transmit SL-PRS 1 to each of UE B-1 504, UE B-2 506, UE B-3 508, UE B-4 510, UE B-5 512, UE B-N 514.

Herein, several solutions provide UE coordination for both the first scenario of FIG. 5A and the second scenario of FIG. 5B. In particular, the UE coordination framework of Rel-17 is adapted for SL-PRS resource allocation assistance.

Embodiments described herein introduce a procedure to request assistance for SL-PRS resource selection from a neighboring UE, specify a container to be used for carrying the resource selection assistance request, and introduce a new dimension for resource selection assistance (i.e., the SL-PRS index) on top of the regular time-frequency dimensions of the resource selection assistance schemes of NR Rel-17.

Embodiments also offer flexibility for transmitting the resource selection assistance request in shared and dedicated resource pools by adding an additional bit to indicate the request for the newly added dimension (i.e., the SL-PRS index), specify a condition-based triggering approach for transmitting the SL-PRS resource selection assistance information, and specify how the assisted UE can utilize the SL-PRS resource selection assistance information received from one or more neighboring UEs. Received preferred resource selection assistance set(s) may be considered as well as received non-preferred resource selection assistance set(s).

Further, embodiments consider the required bandwidth for an SL-PRS transmission when performing sensing to identify the SL-PRS resource selection assistance information. This bandwidth may be pre-configured/configured per resource pool (e.g., based on priority) or may be dynamically indicated by the assisted UE.

Finally, embodiments propose multiple approaches for indicating the preferred or non-preferred SL-PRS indices to the assisted UE, and impose restriction on the transmission of the SL-PRS resource selection assistance information based on a system load metric (e.g., CBR).

Embodiments described herein are advantageous in that they reduce the chances of collision between the SL-PRS transmissions of neighboring UEs, allow UEs to carry more detailed information for resource selection assistance in case of a dedicated resource pool configuration, and increase the chances of time staggering of multiple SL-PRS transmissions from neighboring UEs within a slot.

Embodiments are also advantageous in that they help reduce overhead when the resource selection assistance scheme is used in a shared resource pool, while still enabling resource selection assistance triggering in a dedicated SL-PRS resource pool, reduce signaling overhead by introducing condition-based triggering for SL-PRS resource selection assistance information, and removing ambiguity in utilization of SL-PRS resource selection assistance information received by the assisted UE.

Further, embodiments are advantageous in that that they help the assisting UE to select an amount of resources for selection assistance purposes that matches the requirement at the assisted UE. This helps in reducing resource waste and allows the multiplexing of additional SL-PRSs from neighboring UEs within a slot.

Finally, embodiments are advantageous in that they reduce signaling overhead by allowing the use of a bitmap to indicate multiple SL-PRS indices as preferred or non-preferred to the assisted UE, and allow higher throughput by reducing the number of transmitted SL-PRS resource selection assistance information when the system is highly occupied.

With respect to the use of UE assistance to perform positioning for the first scenario, as described above in FIG. 5A, SL positioning is considered an essential aspect of NR Rel-18. However, since SL-PRSs are transmitted on SL resources, they are vulnerable to resource conflicts that may deteriorate signal quality. It is beneficial to rely on resource selection assistance techniques to potentially improve performance. These techniques may help improve SL positioning reliability in multiple scenarios. As shown in FIG. 5A, a UE may need to receive SL-PRSs from multiple neighboring UEs. In other words, multiple anchor UEs (UE Bs) may assist a target UE (UE A) in achieving high accuracy positioning by sending their SL-PRS.

For the target UE to achieve positioning, it is essential to have a protocol for UE A and UE B to select a set of SL-PRSs and accordingly achieve positioning. FIG. 6A is a flowchart illustrating a method for SL-PRS reception at a UE, according to an embodiment.

At 602, UE A may send a request for positioning assistance. UE A may determine the need to perform positioning, and may send a message to neighboring UE Bs to request the transmission of SL-PRS in several ways. UE A may send individual commands to each UE B, which may not be effective, especially when there are many UE Bs. UE A may send an RRC command to a pre-determined group of neighboring UE Bs. The group of neighboring UE Bs may be all UEs that can receive the message, and in this case, a broadcast message may be used.

UE A may send a physical layer signaling message to request UE Bs to send their SL-PRSs. This signaling request for SL-PRS transmission may be included in the first or second stage SCI or as a MAC CE. A one-bit field may be added to the first or second stage SCI. The signaling of the request for SL positioning may also be dependent on the resource pool configuration. For example, when a dedicated resource pool is configured for SL-PRS transmissions, the indication may be carried in the first stage SCI, whereas for a shared resource pool, the request for SL-PRS transmission may be carried in a MAC CE. In addition, the destination ID in the second stage SCI may also re-purposed to indicate the UEs that are expected to respond to the SL-PRS transmission. For example, if a groupcast ID is used, then all neighboring UEs are expected to respond. Alternatively, if a unicast or groupcast ID is used, then only the corresponding UEs are expected to respond. The request for SL-PRS transmission may include a range, where only UEs that fall within this range are expected to respond.

At 604, UE A may receive a request for SL-PRS resource selection assistance from a UE B. At 606, UE A may perform sensing and provide a set of preferred or non-preferred resources for SL-PRS transmission to the requesting UE B by an RRC message, first or second stage SCI, or MAC CE. At 608, UE A may receive SL-PRSs from UE Bs over resources selected by the corresponding UE Bs, and may perform positioning based on the received SL-PRSs.

FIG. 6B is a flowchart illustrating SL-PRS transmission from a UE, according to an embodiment. At 610, UE B may receive a request for positioning assistance from UE A, as described above in 602 of FIG. 6A.

At 612, UE B may perform SL-PRS assessment based on its sensing information and other criteria (e.g., CBR, SL-PRS transmission priority), and may request resource selection assistance from UE A, or directly transmit the SL-PRS. The SL-PRS priority may be either pre-configured or based on the proximity of the target and anchor UEs, where the closer the UEs, the higher the priority of their SL-PRS transmissions.

At 614, UE B may receive resource selection assistance information, which may include a set of preferred or non-preferred resources, from UE A by an RRC message, first or second stage SCI, or MAC CE.

At 616, UE B may perform assessment based on the received assistance information (i.e., the set of preferred or non-preferred resources) and local sensing information, and may select a resource for SL-PRS transmission. At 618, UE B may transmit the SL-PRS to UE A.

Accordingly, a UE interested in SL positioning may use the first or second stage SCI or MAC CE to send a request for SL-PRS transmission to neighboring UEs. A container for the SL positioning request may be dependent on the resource pool configuration. For example, a dedicated resource pool may use first stage SCI, whereas a shared resource pool may use MAC CE.

Additionally, a destination ID in the second stage SCI may be used to indicate the UEs that are expected to send the SL-PRS. The triggering of neighboring UEs to send their SL-PRS signals may be dependent on their location, where UEs within a specified range from the target UE may be expected to respond with SL-PRS transmissions.

In the second scenario shown in FIG. 5B, resource selection assistance may be beneficial to improve the reliability of the SL-PRS transmission and improve the accuracy of SL positioning. UE A may act as an anchor UE for multiple neighboring UE Bs and may send one or more SL-PRS sequences to multiple UE Bs.

For the UE B to achieve positioning, it is essential to have a protocol for UE A and UE B to select a set of SL-PRSs and accordingly achieve positioning, which is represented in FIGS. 6A and 6B, with the roles of UE A and UE B reversed.

As described above, at 606 of FIG. 6A, when performing UE coordination for positioning purposes, it may be beneficial to have one UE reporting its preferred/non-preferred SL-PRS resources to avoid collisions with neighboring UEs, which is described in greater detail below.

Figure 7:
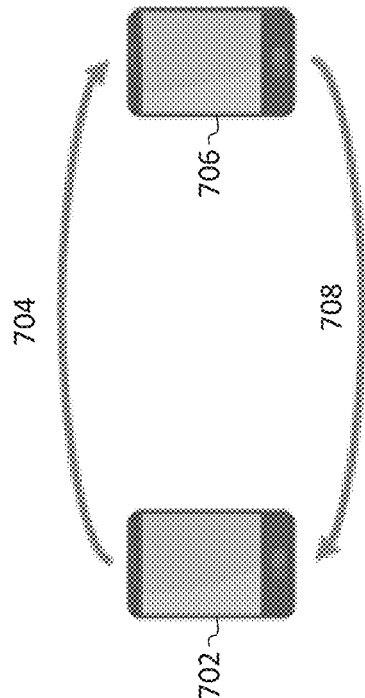
FIG. 7 is a diagram illustrating a resource selection assistance scheme, according to an embodiment.

FIG. 7 is a diagram illustrating a resource selection assistance scheme, according to an embodiment. UE-B 702 may transmit an assistance request 704 to UE A 706. In response, UE-A 706 may transmit a set of preferred or non-preferred resources 708 to UE-B 702.

In NR Rel-17, the first resource selection assistance scheme was introduced to enable the Rx UEs to assist in the resource selection procedure to help resolve the hidden node problem. In particular, the assisting UE may provide a set of preferred or non-preferred resources that can be either used or avoided by the Tx UE when performing its transmission.

When using this resource selection assistance scheme, the Tx UE may send a resource selection assistance request to the Rx UE to provide these resources. Unlike regular transmissions, when performing assistance for SL-PRS resource selection, the Rx UE is not only expected to select the time and frequency resources, but also the index of the resource elements that will be used to carry the SL-PRS (i.e., the SL-PRS index). In particular, SL-PRSs from multiple UEs may be multiplexed within the same time and frequency resources in a staggered design. Depending on the underlying comb structure, a number of UEs may share the same time and frequency resources.

For example, when a comb-4 structure is used, the SL-PRS from at least four UEs may be multiplexed within the same slot/subchannel. In the case of a dedicated resource pool, or a dedicated portion for SL-PRS transmission within a slot in a shared resource pool, multiple UEs may select different indices for their SL-PRS and transmit their SL-PRS simultaneously without interfering with one another.

Hence, when triggering the resource selection assistance, the resource selection assistance request may include an indication of whether the assistance is required for data transmission or for SL-PRS transmission. In other words, the Tx UE should indicate whether an SL-PRS index is requested or not. This request for the SL-PRS may be included in the first or second stage SCI or as a MAC CE. In particular, an additional 1-bit field may be added to the resource selection assistance request to extend the resource selection assistance from time/frequency to time/frequency and SL-PRS index. The detailed fields of the SL resource selection assistance request of NR Rel-17 are set forth in Table 2 below.

of the SL positioning. Furthermore, the transmission of the SL-PRS may be dependent on the type of SL-PRS used. In particular, if a narrow-band SL-PRS is used by the UEs for positioning, then the chances of collisions are lower due to the larger number of potential candidates for SL-PRS transmission, and the SL-PRS may not be included in the assistance information. On the other hand, if a wide-band SL-PRS is needed by the UEs to improve the SL positioning accuracy, then a limited number of candidates may be available for SL-PRS transmission, and the SL-PRS index may be included in the assistance information provided by the Rx UE.

Accordingly, when providing assistance for SL-PRS resource selection, an assisting NR device (UE A) may provide the time-frequency resources as well as a set of SL-PRS indices that can be used by the UE.

Additionally, the transmission of SL-PRS indices within the resource selection information may be triggered explicitly by a new one-bit field in the resource selection assistance request sent in the first or second stage SCI or as a MAC CE. The transmission of SL-PRS indices within the resource selection information may be triggered implicitly by setting

TABLE 2

| Field name | Field size (in bits) |
|---|---|
| Providing/requesting indicator | 1 |
| Priority | 3 |
| Number of subchannels | $\lceil \log_2(N_{subChannel}{}^{SL}) \rceil$ Where $N_{subChannel}{}^{SL}$ is provided by the higher layer parameter sl-NumSubchannel |
| Resource reservation period | Y Where $Y = \lceil \log_2 N_{rsv\_period} \rceil$ with that $N_{rsv\_period}$ is the number of entries in the higher layer parameter sl-ResourceReservePeriodList, if higher layer parameter sl-MultiReserveResoure is configured; $Y = 0$ otherwise. |
| Resource selection window location | $2(10 + \lceil \log_2(10 \cdot 2^\mu) \rceil)$ Where μ is 0, 1, 2, 3 for SCS of 15 kHz, 30 kHz, 60 kHz, 120 kHz, respectively. |
| Resource set type | 1 bit if determineResourceSetTypeScheme1 is set to 'UE-B's request', otherwise, 0 bit |

In another approach, the indication for an SL-PRS index may be carried by repurposing one of the fields of the resource selection assistance request (e.g., the period or the number of subchannels field), when the request is performed for SL-PRS resource selection (e.g., in a dedicated resource pool or a shared resource pool with SL-PRS resource pre-configured/configured). In order to reduce the overhead, the request for the SL-PRS index may be implicit by setting one or more fields of the resource selection procedure to pre-defined values. Alternatively, the Rx UE may rely on the resource pool configuration to decide whether or not to provide an SL-PRS index in the resource selection assistance information. For example, when operating in a dedicated resource, an assisting Rx UE may be required to always provide an SL-PRS index. The transmission of the SL-PRS index in the assistance information may be dependent on the UE capability. In particular, if a neighboring UE exchanges its capability for SL-PRS transmission, then an Rx UE may always, by default, include the SL-PRS index in the assistance information. The inclusion of the SL-PRS index in the assistance information may also be dependent on the UE priority. For example, for high priority UEs (e.g., those in close proximity), the SL-PRS index may always be included in the assistance information to improve reliability one or more fields of the resource selection assistance request sent in the first or second stage SCI or as a MAC CE to pre-defined values.

Further, the transmission of SL-PRS indices within the resource selection information may be triggered by one or more of conditions. Such conditions include assistance information provided for a dedicated resource pool for SL-PRS transmission or a shared resource pool with pre-configured/configured SL-PRS resources, UE capability exchange indicating support of SL-PRS transmission, UE priority (e.g., based on Tx-Rx UE proximity), and SL-PRS type (e.g., narrowband or wide-band).

The implementation and use of received resource selection assistance, as described in 616 of FIG. 6B, is described in greater detail below.

After receiving assistance information, it may be expected that an assisted UE will incorporate this information along with its sensing information when performing resource selection. In particular, in the case of a preferred resource set, the UE may perform an intersection between the resources indicated by the assisting UE and resources obtained through sensing, and may select the resources for SL-PRS transmission. In particular, the set of preferred resources and the set of candidates resources for SL-PRS transmission are both passed to the higher layer. Subsequently, the higher layer performs a selection from the intersection of both sets. If additional resources are needed for SL-PRS transmission, a UE may select from the set of candidates resources obtained through local sensing after exhausting all of the resources obtained through resource selection assistance. The resource selection process may be summarized as follows when sensing information is available at the assisted UE.

In the case of receiving a non-preferred resource (i.e., time/frequency/SL-PRS index) set from the assisting UE, a set of candidates resources may also be obtained based on sensing the resources occupied by neighboring UEs. The non-preferred resources may be excluded from the set of candidate resources. If the number of remaining resources in the candidate resource set is above a pre-configured/configured threshold, the set may be passed to the higher layer for resource selection. If the number of remaining resources in the candidate resource set is below a pre-configured/configured threshold, the candidate resource set may be augmented by randomly selecting one or more of the excluded resources until the threshold is met. A resource for transmission may be selected from the set of remaining candidate resources.

Figure 8:
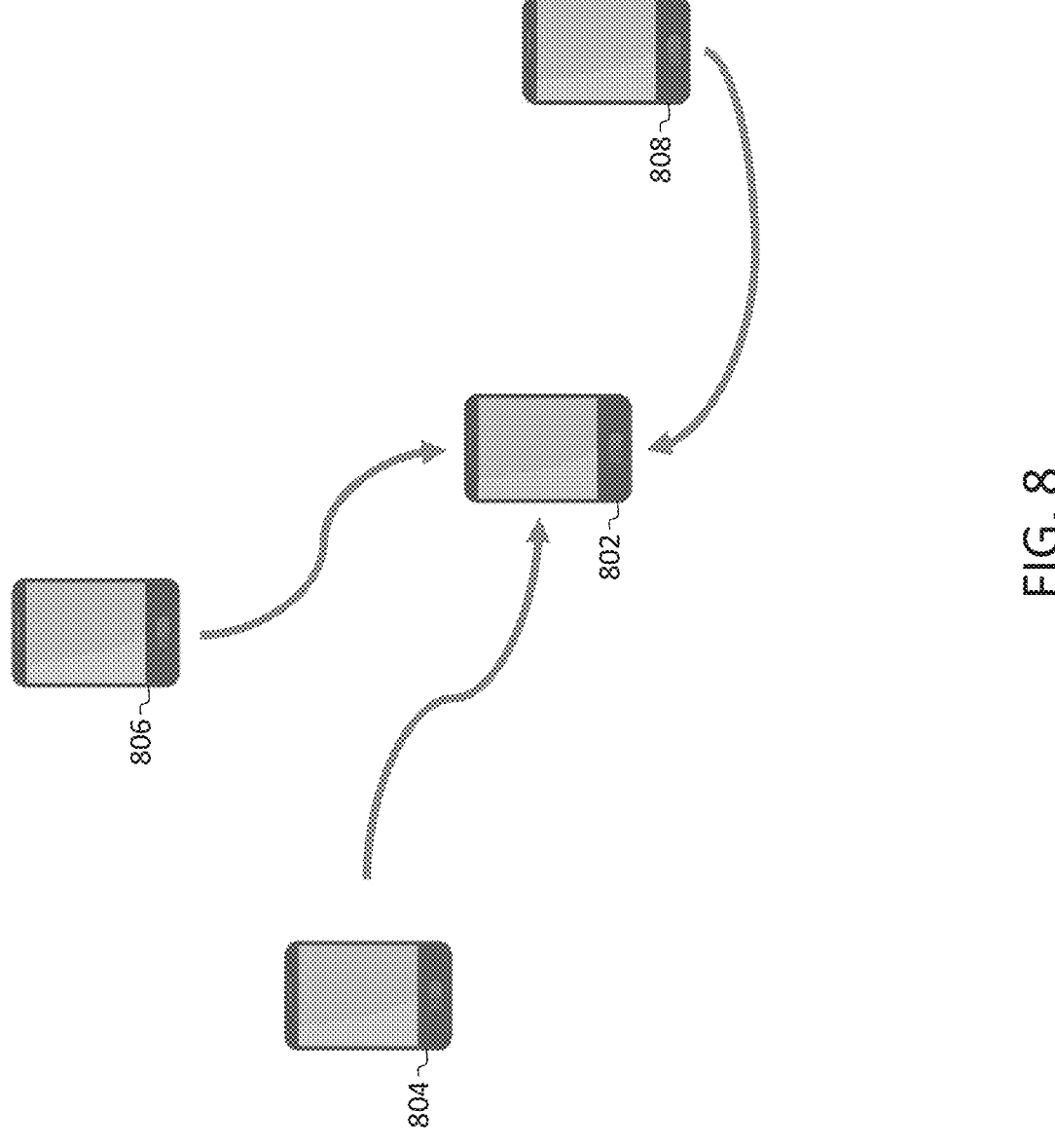
FIG. 8 is a diagram illustrating an NR UE receiving resource selection assistance from multiple UEs, according to an embodiment.

FIG. 8 is a diagram illustrating an NR UE receiving resource selection assistance from multiple UEs, according to an embodiment. This occurs in the scenario of FIG. 5B, and illustrates 614 of FIG. 6B. UE A 802 may receive a first resource set from UE B-1 804, a second resource set from UE B-2 806, and a third resource set from UE B-3 808.

In the case of multiple preferred resource sets received from multiple UE Bs, UE A may use the preferred resource set received from a respective UE B when sending its SL-PRS to that UE B.

In the case of multiple non-preferred resource sets received from multiple UE Bs, all of the received non-preferred resource sets may be excluded from the candidate resource set before performing resource selection to avoid interfering with any neighboring UE B. If the number of remaining resources after exclusion is below a pre-configured threshold, UE A may randomly augment the set of candidate resources with the excluded resources until the threshold is met.

In the case of multiple preferred and multiple non-preferred resources received simultaneously from multiple UE Bs, UE A may first perform the exclusion of the non-preferred resources. Subsequently, UE A may use the preferred resource set received from a respective UE B when sending its SL-PRS to that UE B. If the number of remaining resources after exclusion is below a pre-configured/configured threshold, UE A may randomly augment the set of candidate resources with the excluded resources until the threshold is met.

In case of a single preferred and a single non-preferred resource set received from a UE B, UE A may first perform the exclusion of the non-preferred resources. Subsequently, UE A may use the preferred resource set received when sending its SL-PRS to that UE B.

Accordingly, when an assisted UE receives a set of preferred resources and has a set of candidate resources based on its local sensing information, the assisted UE may first select the resources for its SL-PRS transmission from the intersection of the two sets.

Additionally, when an assisted UE receives a set of preferred resources and has a set of candidate resources based on its local sensing information, the assisted UE may attempt to select resources for its SL-PRS transmission from the set of candidate resources once the preferred set is exhausted.

Further, when an assisted UE receives a set of non-preferred resources and has a set of candidate resources based on its local sensing information, the assisted UE may exclude the non-preferred resources from its set of candidate resources and perform resource selection from the set of remaining candidate resources for its SL-PRS transmission if the number of remaining candidates is above a threshold.

Finally, after the assisted UE excludes the set of non-preferred resources from the set of candidate resources, the assisted UE may randomly select some of the excluded resources and use them to augment the set of remaining candidate resources, such that the remaining candidate resources after resources exclusion are above a preconfigured/configured threshold.

Other signaling aspects may further improve the efficiency of the protocols as set forth in detail below.

In order to provide resource selection assistance information (including the SL-PRS index), an assisting UE may be required to perform sensing in order to identify the time/frequency resources and the SL-PRS indices reserved by neighboring UEs. Subsequently, the assisting UE may provide a set of preferred or non-preferred resources. However, in order to perform resource selection, the assisting UE must be aware of the number of resources that are needed for the SL-PRS transmission. In particular, the assisting UE must know the required bandwidth for the SL-PRS transmission (e.g., narrowband or wide-band). This resembles the approach of resource selection by the Mode 2 resource selection procedure in which the higher layer indicates the number of required subchannels for transmission.

In order to obtain the SL-PRS bandwidth, it may be pre-configured/configured per resource pool. The SL-PRS bandwidth may also be dependent on whether the SL-PRS transmission is in a dedicated or shared resource pool. For example, in case of a dedicated resource pool, a wide-band SL-PRS may be used to improve positioning accuracy, whereas in a shared resource pool, a narrowband SL-PRS may be used to enable the multiplexing of multiple UEs transmissions (e.g., data and SL-PRS) in a slot. The multiple possible bandwidths for SL-PRS (e.g., narrowband and wide-band) may also be preconfigured/configured per resource pool. In this case, the UE requesting the assistance may indicate the bandwidth needed to transmit the SL-PRS.

This indication may be carried in the resource selection assistance request. A new single or multiple bit field may be added to the resource selection assistance request sent in the first or second stage SCI or as a MAC CE to indicate the index of the required bandwidth for the SL-PRS transmission from the set that is preconfigured/configured per resource pool. Alternatively, this indication may be carried by repurposing one of the fields of the resource selection assistance request (e.g., the period or the number of subchannels field) when the request is performed for SL-PRS resource selection.

In another approach, this indication may be implicit by setting one or more fields of the resource selection assistance request field to pre-defined values. In an additional approach, the SL-PRS bandwidth may be dependent on the UE priority (e.g., UEs in close proximity may be considered high priority, as described in greater detail below), whereby a high priority UE may use a wide-band SL-PRS to improve the positioning accuracy, and a low priority UE may use a narrowband SL-PRS to enable multiplexing of multiple UEs. Finally, the bandwidth for SL-PRS transmission may be selected by the assisting UE and indicated in the resource selection assistance information. In particular, this may be achieved by using the frequency resource indication value (FRIV) field (i.e., assigning more frequency resources to the UE that requested the assistance for SL-PRS transmission).

Accordingly, when performing sensing and resource selection to provide assistance information, the assisting UE may consider the required bandwidth to transmit the SL-PRS.

The bandwidth required to transmit the SL-PRS may be pre-configured/configured per resource pool and may be dependent on the resource pool type (e.g., shared or dedicated).

The bandwidth required to transmit the SL-PRS may be dynamically indicated in the resource selection assistance request sent in the first or second stage SCI or as a MAC CE (e.g., either explicitly by reusing one of the fields of the resource selection assistance request or a new field, or implicitly by setting one or more fields to pre-defined values).

The bandwidth required to transmit the SL-PRS may be dependent on UE priority. Higher priority UEs may use dedicated resources to transmit SL-PRS with a larger bandwidth.

To enable the application of resource selection assistance for SL-PRS resource selection, a UE may efficiently signal the SL-PRS index along with other NR Rel-17 resource assistance information (e.g., time slot, subchannel, number of subchannels, periodicity). Several approaches may be used to achieve this.

In a first approach, a new bitmap may be added to the resource selection assistance payload. The length of the bitmap may be equal to the pre-configured/configured comb structure of the resource pool. Subsequently, by setting the X-th bit of the bitmap, this may indicate that this SL-PRS index is either preferred or non-preferred depending on the type of assistance information (i.e., a preferred or a non-preferred resource set). Despite the advantages of this signaling approach, it may result in high overhead since at least "SL-PRS comb_size" bits may be needed to indicate the SL-PRS indices for one time/frequency resource.

In a second approach, an assisting UE may explicitly indicate only one SL-PRS index within the selected time/frequency resource as either preferred or non-preferred. The main advantage of this approach is that it reduces the signaling overhead since only $\log_2$ (SL-PRS comb_size) bits are needed for this indication.

In a third approach, an assisting UE may indicate a slot/subchannel resource as a preferred resource only if all the SL-PRS indices of this resource are preferred for resource selection (i.e., available for resource selection). Similarly, an assisting UE may indicate a slot/subchannel resource as a non-preferred resource if any of the SL-PRS indices of this resource are non-preferred (e.g., occupied by a neighboring UE or reserved by the assisting UE for a future transmission) for resource selection.

Accordingly, after indicating the time/frequency resource using the time resource indication value (TRIV) and FRIV fields, an assisting UE may use a bitmap to indicate the available SL-PRS indices within this resource, where each bit corresponds to one SL-PRS index.

When providing assistance information, an assisting UE may be limited to indicating only one SL-PRS index as either preferred or non-preferred within the signaled time/frequency resource.

An assisting UE may implicitly indicate the occupancy of the SL-PRS indices by selecting the time/frequency resources with all SL-PRS indices available in case of preferred assistance set or time/frequency resources with at least one SL-PRS index occupied in case of non-preferred assistance set.

In NR Rel-18, it may be expected that NR UEs can request assistance for selecting resources for their SL-PRS transmissions in shared/dedicated resource pools. In other words, an NR UE may rely on a slightly modified version of the resource selection assistance scheme 1 of NR Rel-17 to obtain either a set of preferred time/frequency/SL-PRS index resources to use for its SL-PRS transmission or a set of non-preferred resources to be avoided when performing the SL-PRS transmission. Despite the advantage of this approach in reducing the number of potential collisions between SL-PRS transmission between neighboring UEs, it may result in limiting the number of available resources for transmission. In particular, exchanging the resource selection assistance request and the corresponding assistance information between NR UEs may consume a large number of resources that could have otherwise been used for SL-PRS transmissions. In addition, when the system is highly occupied (e.g., when the CBR is high), the number of available resources for SL-PRS may be very limited. To address this drawback, there may be a limitation on the exchange of resource selection assistance requests/response depending on system occupancy. In particular, if the measured CBR is above a pre-configured threshold, the ability to send resource selection assistance request/responses may be disabled to free available resources for SL-PRS transmissions. This threshold may be pre-configured per resource pool and can be dependent on the priority of the UE performing the transmissions. In particular, when the system is highly loaded, only high priority UEs (e.g., UEs that are in close proximity) may be allowed to transmit resource selection assistance requests and obtain assistance from their neighbors to improve the reliability of their SL-PRS transmissions.

Accordingly, the ability of NR UEs to request/provide resource selection assistance information for SL-PRS resource selection may be limited when the system is highly occupied (e.g., when the measured CBR is above a pre-configured threshold).

The restriction on the transmission of SL-PRS resource selection assistance requests/responses may be dependent on the UE priority, whereby high priority UEs may still be able to request/send assistance information even when the system is highly occupied (i.e., when the measured CBR is high).

Figure 9:
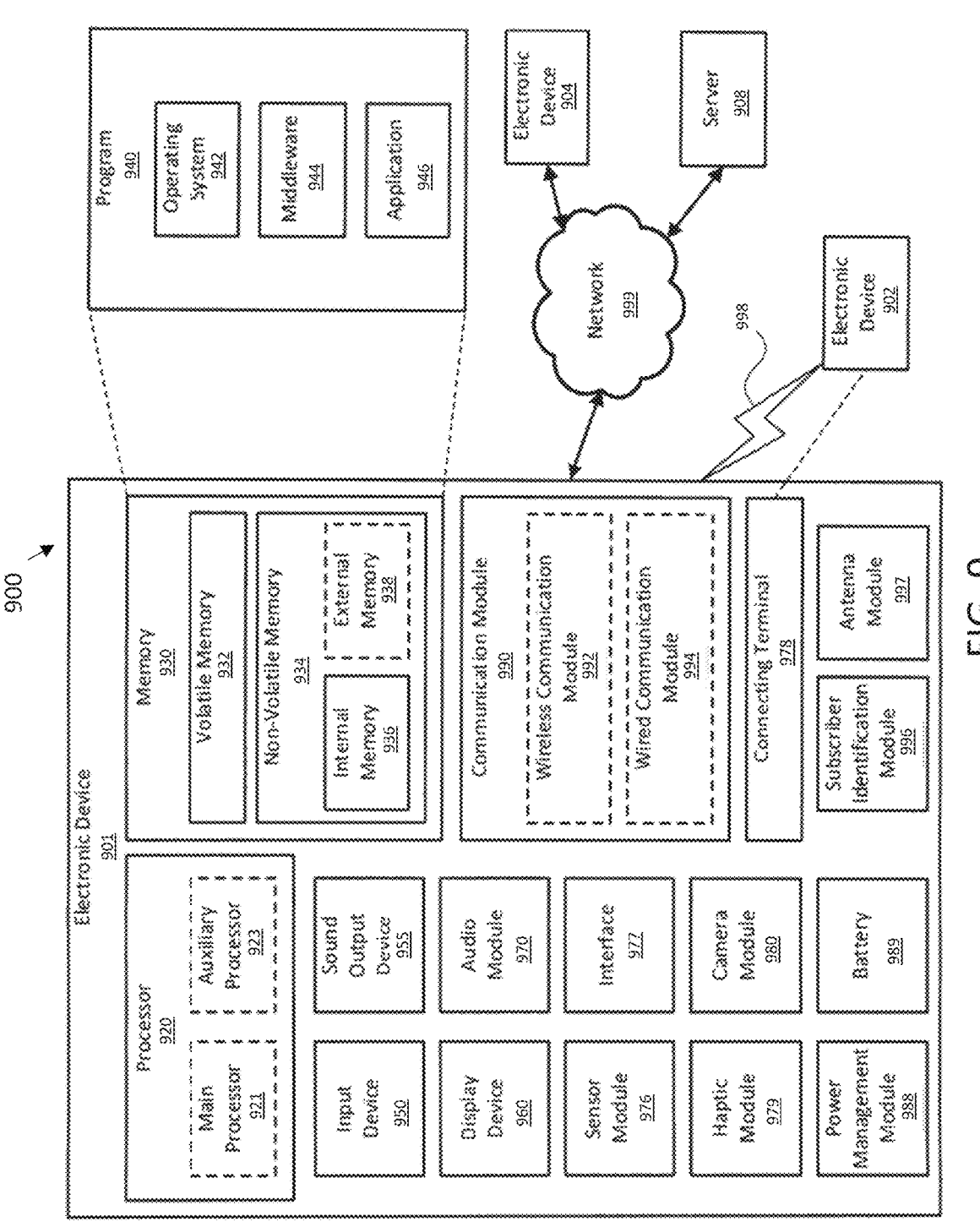
FIG. 9 is a block diagram of an electronic device in a network environment, according to an embodiment.

FIG. 9 is a block diagram of an electronic device in a network environment 900, according to an embodiment.

Referring to FIG. 9, an electronic device 901 in a network environment 900 may communicate with an electronic device 902 via a first network 998 (e.g., a short-range wireless communication network), or an electronic device 904 or a server 908 via a second network 999 (e.g., a long-range wireless communication network). The electronic device 901 may communicate with the electronic device 904 via the server 908. The electronic device 901 may include a processor 920, a memory 930, an input device 950, a sound output device 955, a display device 960, an audio module 970, a sensor module 976, an interface 977, a haptic module 979, a camera module 980, a power management module 988, a battery 989, a communication module 990, a subscriber identification module (SIM) card 996, or an antenna module 997. In one embodiment, at least one (e.g., the display device 960 or the camera module 980) of the components may be omitted from the electronic device 901, or one or more other components may be added to the electronic device 901. Some of the components may be implemented as a single integrated circuit (IC). For example, the sensor module 976 (e.g., a fingerprint sensor, an iris sensor, or an illuminance sensor) may be embedded in the display device 960 (e.g., a display).

The processor 920 may execute software (e.g., a program 940) to control at least one other component (e.g., a hardware or a software component) of the electronic device 901 coupled with the processor 920 and may perform various data processing or computations.

As at least part of the data processing or computations, the processor 920 may load a command or data received from another component (e.g., the sensor module 976 or the communication module 990) in volatile memory 932, process the command or the data stored in the volatile memory 932, and store resulting data in non-volatile memory 934. The processor 920 may include a main processor 921 (e.g., a central processing unit (CPU) or an application processor (AP)), and an auxiliary processor 923 (e.g., a graphics processing unit (GPU), an image signal processor (ISP), a sensor hub processor, or a communication processor (CP)) that is operable independently from, or in conjunction with, the main processor 921. Additionally or alternatively, the auxiliary processor 923 may be adapted to consume less power than the main processor 921, or execute a particular function. The auxiliary processor 923 may be implemented as being separate from, or a part of, the main processor 921.

The auxiliary processor 923 may control at least some of the functions or states related to at least one component (e.g., the display device 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). The auxiliary processor 923 (e.g., an image signal processor or a communication processor) may be implemented as part of another component (e.g., the camera module 980 or the communication module 990) functionally related to the auxiliary processor 923.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934. Non-volatile memory 934 may include internal memory 936 and/or external memory 938.

The program 940 may be stored in the memory 930 as software, and may include, for example, an operating system (OS) 942, middleware 944, or an application 946.

The input device 950 may receive a command or data to be used by another component (e.g., the processor 920) of the electronic device 901, from the outside (e.g., a user) of the electronic device 901. The input device 950 may include, for example, a microphone, a mouse, or a keyboard.

The sound output device 955 may output sound signals to the outside of the electronic device 901. The sound output device 955 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 960 may visually provide information to the outside (e.g., a user) of the electronic device 901. The display device 960 may include, for example, a display, a hologram device, or a projector and control circuitry to control a corresponding one of the display, hologram device, and projector. The display device 960 may include touch circuitry adapted to detect a touch, or sensor circuitry (e.g., a pressure sensor) adapted to measure the intensity of force incurred by the touch.

The audio module 970 may convert a sound into an electrical signal and vice versa. The audio module 970 may obtain the sound via the input device 950 or output the sound via the sound output device 955 or a headphone of an external electronic device 902 directly (e.g., wired) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. The sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device 902 directly (e.g., wired) or wirelessly. The interface 977 may include, for example, a high-definition multimedia interface (HDMI), a universal serial bus (USB) interface, a secure digital (SD) card interface, or an audio interface.

A connecting terminal 978 may include a connector via which the electronic device 901 may be physically connected with the external electronic device 902. The connecting terminal 978 may include, for example, an HDMI connector, a USB connector, an SD card connector, or an audio connector (e.g., a headphone connector).

The haptic module 979 may convert an electrical signal into a mechanical stimulus (e.g., a vibration or a movement) or an electrical stimulus which may be recognized by a user via tactile sensation or kinesthetic sensation. The haptic module 979 may include, for example, a motor, a piezoelectric element, or an electrical stimulator.

The camera module 980 may capture a still image or moving images. The camera module 980 may include one or more lenses, image sensors, image signal processors, or flashes. The power management module 988 may manage power supplied to the electronic device 901. The power management module 988 may be implemented as at least part of, for example, a power management integrated circuit (PMIC).

The battery 989 may supply power to at least one component of the electronic device 901. The battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the AP) and supports a direct (e.g., wired) communication or a wireless communication. The communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as BLUETOOTH™, wireless-fidelity (Wi-Fi) direct, or a standard of the Infrared Data Association (IrDA)) or the second network 999 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The antenna module 997 may transmit or receive a signal or power to or from the outside (e.g., the external electronic device) of the electronic device 901. The antenna module 997 may include one or more antennas, and, therefrom, at least one antenna appropriate for a communication scheme used in the communication network, such as the first network 998 or the second network 999, may be selected, for example, by the communication module 990 (e.g., the wireless communication module 992). The signal or the power may then be transmitted or received between the communication module 990 and the external electronic device via the selected at least one antenna.

Commands or data may be transmitted or received between the electronic device 901 and the external electronic device 904 via the server 908 coupled with the second network 999. Each of the electronic devices 902 and 904 may be a device of a same type as, or a different type, from the electronic device 901. All or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 901. The electronic device 901 may provide the outcome, with or without further processing of the outcome, as at least part of a reply to the request. To that end, a cloud computing, distributed computing, or client-server computing technology may be used, for example.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method comprising:

receiving, at a first user equipment (UE), a request for positioning assistance from a second UE in a dedicated field of sidelink (SL) control information (SCI);

transmitting, from first UE, a request for assistance in selecting resources for SL-positioning reference signal (PRS) transmission, to a second UE;

receiving, at the first UE, a set of one or more preferred or non-preferred resources for the SL-PRS transmission, from the second UE; and selecting, by the first UE, the resources for the SL-PRS transmission based on at least the set of one or more preferred or non-preferred resources, wherein SL-PRS indices are indicated explicitly via a bitmap, wherein each bit of the bitmap corresponds to a respective SL-PRS index.

2. The method of claim 1, wherein the request for assistance in selecting resources for the SL-PRS transmission is carried in first or second stage SL control information (SCI).

3. The method of claim 1, wherein the set of one or more preferred or non-preferred resources is carried in first or second stage SCI or as a medium access control (MAC) control element (CE).

4. The method of claim 1, wherein the set of one or more preferred or non-preferred resources comprises time-frequency resources and the SL-PRS indices.

5. The method of claim 4, wherein:

the time-frequency resources are indicated via time resource indication value (TRIV) and frequency resource indication value (FRIV) fields.

6. The method of claim 1, wherein the set of one or more preferred or non-preferred resources comprises a set of one or more preferred resources, and further comprising:

determining, by the first UE, a set of one or more candidate resources based on sensing information at the first UE, wherein the resources are selected based on an intersection of the set of one or more preferred resources and the set of one or more candidate resources, or wherein the resources are selected from the set of one or more candidate resources after the set of one or more preferred resources is exhausted.

7. The method of claim 1, wherein the set of one or more preferred or non-preferred resources comprises a set of one or more non-preferred resources, and further comprising:

determining, by the first UE, a set of one or more candidate resources based on sensing information at the first UE; and excluding resources of the set of one or more non-preferred resources from the set of one or more candidate resources, wherein, in case that a number of remaining resources in the set of one or more candidate resources is greater than a threshold, the resources are selected from the remaining resources, and wherein, in case that the number of remining resources is not greater than the threshold:

randomly selecting at least one of the excluded resources to augment the remaining resources such that a number of the augmented remaining resources is greater than the threshold, wherein the resources are selected from the augmented remaining resources.

8. The method of claim 1, further comprising:

receiving, at the first UE, a request for positioning assistance from the second UE in a dedicated field of SCI; and transmitting, from the first UE, an SL-PRS on the resources to the second UE.

9. The method of claim 8, wherein:

the dedicated field of the SCI comprises a single-bit field of first stage SCI or second stage SCI.

10. The method of claim 9, wherein the request for positioning assistance is received in the first stage SCI for a dedicated resource pool or in the second stage SCI for a shared resource pool.

11. A first user equipment (UE) comprising:

a processor; and a non-transitory computer readable storage medium storing instructions that, when executed, cause the processor to:

receive a request for positioning assistance from a second UE in a dedicated field of sidelink (SL) control information (SCI);

transmit a request for assistance in selecting resources for SL-positioning reference signal (PRS) transmission, to the second UE;

receive a set of one or more preferred or non-preferred resources for SL-PRS transmission, from the second UE; and select resources for the SL-PRS transmission based on at least the set of one or more preferred or non-preferred resources, wherein SL-PRS indices are indicated explicitly via a bitmap, wherein each bit of the bitmap corresponds to a respective SL-PRS index.

12. The first UE of claim 11, wherein the dedicated field of the SCI comprises a single-bit field of first stage SCI or second stage SCI.

13. The first UE of claim 11, wherein the request for positioning assistance is received in the first stage SCI for a dedicated resource pool or in the second stage SCI for a shared resource pool.

14. The first UE of claim 11, wherein:

the set of one or more preferred or non-preferred resources comprises time-frequency resources and the SL-PRS indices;

the time-frequency resources are indicated via time resource indication value (TRIV) and frequency resource indication value (FRIV) fields.

* * * * *